(12) United States Patent
Tsuchiyama (10) Patent No.: US 8,873,257 B2
(45) Date of Patent: Oct. 28, 2014

(54) POWER SUPPLY APPARATUS WITH DRIVE CONTROL SIGNAL INVERSION BASED UPON RESONANCE CURRENT LEVEL DETECTION

(75) Inventor: Tomonori Tsuchiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 277 days.

(21) Appl. No.: 13/492,117

(22) Filed: Jun. 8, 2012

(65) Prior Publication Data

US 2012/0320636 A1  Dec. 20, 2012

(30) Foreign Application Priority Data

Jun. 17, 2011 (JP) ................. 2011-135654

(51) Int. Cl.
   H02M 3/335 (2006.01)
   H02H 7/122 (2006.01)
   H02M 3/337 (2006.01)
   H02M 1/00 (2006.01)

(52) U.S. Cl.
   CPC .......... *H02M 3/3376* (2013.01); *Y02B 70/1433* (2013.01); *Y02B 70/1491* (2013.01); *H02M 2001/0058* (2013.01)
   USPC ............ 363/56.03; 363/21.02; 363/56.04

(58) Field of Classification Search
   USPC ............. 363/16, 21.01–21.18, 56.01–56.12
   See application file for complete search history.

(56) References Cited

U.S. PATENT DOCUMENTS

| | | | |
|---|---|---|---|
| 4,716,509 A * | 12/1987 | Roccucci | 363/26 |
| 4,843,532 A * | 6/1989 | Freedman | 363/26 |
| 7,558,037 B1 * | 7/2009 | Gong et al. | 361/93.1 |
| 8,222,835 B2 * | 7/2012 | Komatsu | 315/307 |
| 2003/0095421 A1 * | 5/2003 | Kadatskyy et al. | 363/65 |
| 2005/0265058 A1 * | 12/2005 | Stevanovic et al. | 363/131 |
| 2008/0266907 A1 * | 10/2008 | Kim et al. | 363/21.1 |
| 2009/0097280 A1 * | 4/2009 | Wu et al. | 363/17 |
| 2010/0134080 A1 * | 6/2010 | Ouyang | 323/282 |
| 2011/0043122 A1 * | 2/2011 | Alexandrov | 315/246 |
| 2011/0228566 A1 * | 9/2011 | Liang | 363/21.02 |

FOREIGN PATENT DOCUMENTS

JP   2005-198457   7/2005

* cited by examiner

*Primary Examiner* — Timothy J Dole
*Assistant Examiner* — Yusef Ahmed
(74) *Attorney, Agent, or Firm* — Rader, Fishman & Grauer PLLC (57) ABSTRACT

A control circuit performs at least one of detecting whether the resonance current detected by the current detection unit is beyond a first detection level over a predetermined time period, and detecting, when detecting that the resonance current is beyond the first detection level over the predetermined time period, that the resonance current falls below a second detection level, and detecting whether the resonance current detected by the current detection unit is below a first detection level over a predetermined time period, and detecting, when detecting that the resonance current is below the first detection level over the predetermined time period, that the resonance current exceeds a second detection level, and inverts, when detecting that the resonance current falls below or exceeds the second detection level, the levels of the drive control signal at which the first switching element and the second switching element are turned on or off.

8 Claims, 5 Drawing Sheets

POWER SUPPLY APPARATUS WITH DRIVE CONTROL SIGNAL INVERSION BASED UPON RESONANCE CURRENT LEVEL DETECTION

CROSS REFERENCE(S) TO RELATED APPLICATIONS

This application claims the benefit under 35 U.S.C. Section 119 of Japanese Patent Application No. 2011-135654 filed on Jun. 17, 2011, which is hereby incorporated by reference in its entirety into this application.

BACKGROUND

The present technology relates to a resonant switching power supply apparatus used in various electronic devices such as a television set.

Various different resonant switching power supply apparatuses have been proposed (for example, see Japanese Patent Application Laid-open No. 2005-198457, hereinafter referred to as Patent Document 1).

Figure 1:
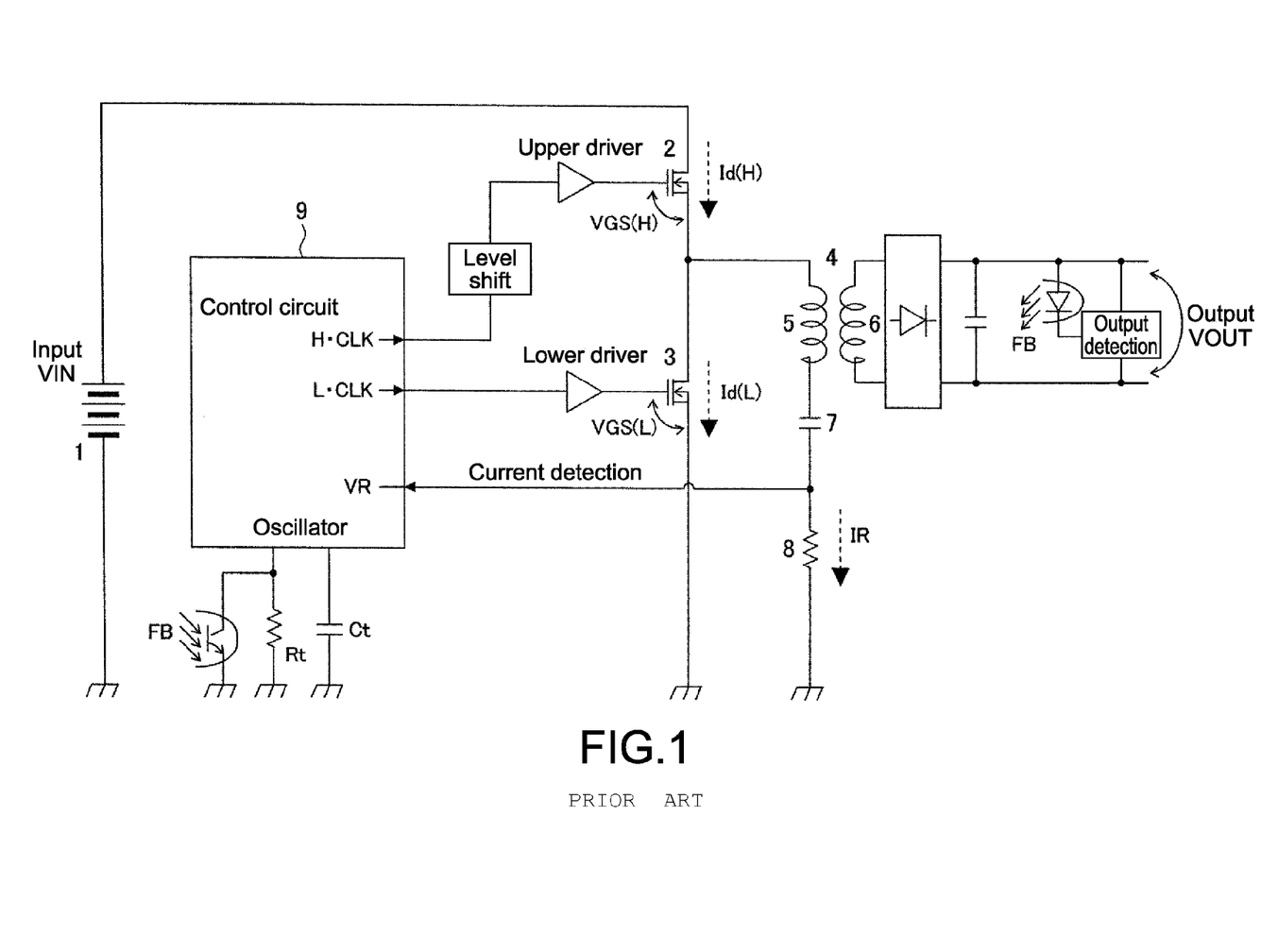
FIG. 1 is a circuit diagram illustrating a structure of a switching power supply apparatus (resonance circuit) disclosed in Patent Document 1.

FIG. 1 is a circuit diagram illustrating a structure of a switching power supply apparatus (resonance circuit) disclosed in Patent Document 1.

The switching power supply apparatus illustrated in FIG. 1 has a series circuit including a first switching element (high-side switching element) 2 and a second switching element (low-side switching element) 3, and connected to both ends of a DC power 1.

A gate terminal of each of the first switching element 2 and the second switching element 3 is connected to an output terminal for a gate signal that is a drive control pulse from a control circuit 9. The first switching element 2 and the second switching element 3 are alternately turned on or off.

Furthermore, the second switching element 3 is connected in parallel to a series circuit including a resonance capacitor 7 and a primary side inductor 5 among the primary winding (coil, inductor) 5 and a secondary winding 6, between which are insulated, of a transformer 4. Furthermore, the resonance capacitor 7 is connected in series to a current detection unit 8 including a resistive element.

For a period of time during a current through the first and second switching elements 2 and 3 flows through one of body diodes of the elements 2 and 3, a control circuit 10 inhibits inversion of a gate signal, so that the on-state of a switch through which this current flows is maintained.

When an off-resonance condition is detected, the control circuit 10 inverts a gate signal to the switching elements 2 and 3 after a current through the switching elements 2 and 3 flows through the body diodes thereof.

This switching power supply apparatus (resonance circuit) employs a technology to avoid destruction of the first switching element 2 and the second switching element 3 due to excessive stress induced by a di/dt mode, etc., by reducing an oscillatory frequency of a power supply when an off-resonance condition is present.

SUMMARY

However, the technology disclosed in Patent Document 1 is insufficient in noise immunity so that malfunctions may be caused when a terminal for detecting a current is subjected to noise during a heavy load detection period.

Furthermore, if a first detection level as a threshold associated with off-resonance is exceeded after an expected heavy load period, operation is disabled.

The present technology is directed to provide a switching power supply apparatus with high noise immunity so that off-resonance may be surely prevented with no malfunctions, which in turn may provide stable operations of transistors which constitute a switching element.

According to an embodiment of the present technology, there is provided a switching power supply apparatus, including: a DC power supply including a high-side terminal and a low-side terminal; a first switching element and a second switching element, connected in series between the high-side terminal and the low-side terminal of the DC power supply; a resonance inductor and a resonance capacitor, connected in series to a connection point for the first and second switching elements; an output circuit configured to supply power to a load based on a resonance current provided by the resonance inductor and the resonance capacitor; a current detection unit configured to detect a resonance current passing through at least one of the first switching element and the second switching element; and a control circuit configured to generate a drive control signal at levels at which the first switching element and the second switching element are alternately turned on or off, to control a cycle of the drive control signal according to the detection signal from the current detection unit so that the output power from the output circuit is maintained constant, to perform at least one of detecting whether or not the resonance current detected by the current detection unit is beyond a first detection level over a predetermined time period, and detecting, in a case of detecting that the resonance current is beyond the first detection level over the predetermined time period, that the resonance current falls below a second detection level, and detecting whether or not the resonance current detected by the current detection unit is below a first detection level over a predetermined time period, and detecting, in a case of detecting that the resonance current is below the first detection level over the predetermined time period, that the resonance current exceeds a second detection level, and to invert, in a case of detecting that the resonance current falls below or exceeds the second detection level, the levels of the drive control signal at which the first switching element and the second switching element are turned on or off.

According to the embodiment of the technology, high noise immunity is provided so that off-resonance may be surely prevented without occurrence of malfunctions, which in turn may provide stable operations of transistors that constitutes a switching element.

These and other objects, features and advantages of the present disclosure will become more apparent in light of the following detailed description of best mode embodiments thereof, as illustrated in the accompanying drawings.

DETAILED DESCRIPTION OF EMBODIMENTS

Figure 2:
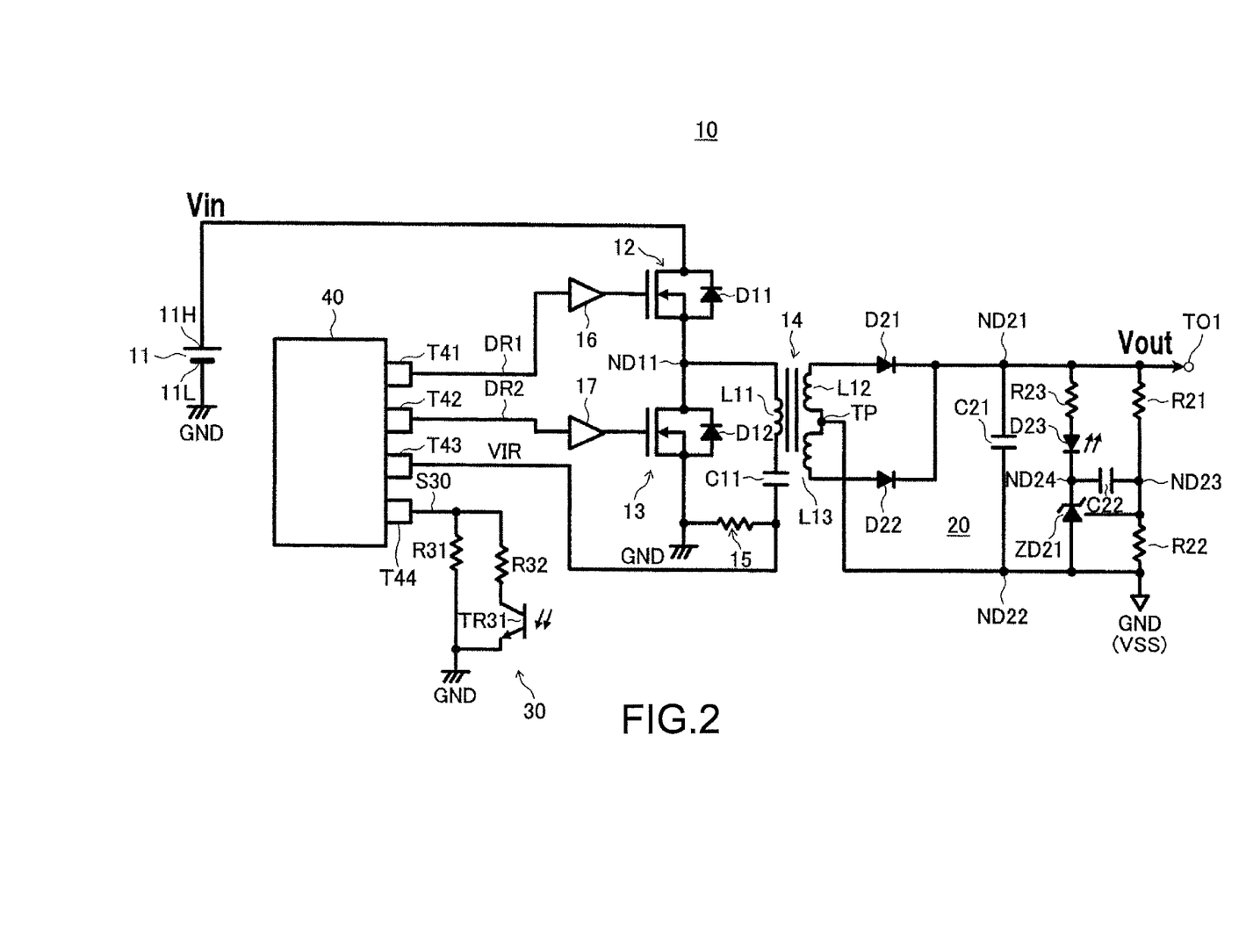
FIG. 2 is a circuit diagram illustrating a structure of a switching power supply apparatus according to an embodiment of the present technology.

Hereinafter, an embodiment of the present technology will be described with reference to the accompanying drawings in the sequence as follows.
1. Exemplary Basic General Structure of Switching Power Supply Apparatus
2. Exemplary Specific Structure of Control Circuit
3. Operations of Control Circuit
(1. Exemplary Basic General Structure of Switching Power Supply Apparatus)
FIG. 2 is a circuit diagram illustrating an exemplary general structure of a switching power supply apparatus according to an embodiment of the present technology.

The switching power supply apparatus (hereinafter simply referred to as "power supply apparatus") 10 according to this embodiment has a reference power supply 11, a first switching element 12, a second switching element 13, a transformer 14, a current detection unit 15, and drivers 16 and 17.

The power supply apparatus 10 further has an output circuit 20, a feedback unit 30, and a control circuit 40.

The reference power supply 11 is a DC power supply, and includes a high-side terminal 11H and a low-side terminal 11L. The low-side terminal 11L is connected to a reference potential, for example, the ground potential GND.

The first switching element 12 and the second switching element 13 are connected in series between the high-side terminal 11H and the low-side terminal 11L (GND) of the reference power supply 11.

Particularly, the first switching element 12 is connected to the high-side terminal 11H, while the second switching element 13 is connected to the low-side terminal 11L.

Furthermore, a connection point ND11 for the first switching element 12 and the second switching element 13 is connected to one end of a primary side winding of the transformer 14.

Specifically, the connection point ND11 is connected to a series circuit of a resonance capacitor C11 and a primary side resonance inductor L11 among the primary winding L11 and secondary windings L12 and L13 (coils, inductors) of the transformer 14 in which the primary side and the secondary side thereof are insulated to each other.

Furthermore, the resonance capacitor C11 is connected in series to the current detection unit 15 including a resistive element.

The first switching element 12 is, for example, formed of an n-channel insulated-gate field effect transistor (FET, NMOS transistor).

The first switching element 12 has a drain connected to the high-side terminal 11H of the reference power supply 11, and a source connected to the connection point ND11 which is in turn connected to the second switching element 13.

The first switching element 12 has a body diode (parasitic diode) D11 that is formed between the source and the drain so that the forward direction is directed from the source to the drain.

The first switching element 12 also has a gate connected to a drive terminal T41 of the control circuit 40 via the driver 16. The control circuit 40 supplies, to the gate, a first drive control pulse DR1 as a first drive control signal indicative of one of two levels, that is, HIGH level and LOW level.

The first switching element 12 is basically controlled to remain at ON-state during a period in which the first drive control pulse DR1 is at HIGH level, and is controlled to remain at OFF-stated during a period in which the first drive control pulse DR1 is at LOW level.

The first switching element 12 is iteratively controlled to be turned on or off according to the first drive control pulse DR1 from the control circuit 40.

The second switching element 13 is, for example, formed of an n-channel insulated-gate field effect transistor (FET, NMOS transistor).

The second switching element 13 has a source that is connected to the low-side terminal 11L of the reference power supply 11, and a drain that is connected to the connection point ND11 which is in turn connected to the first switching element 12.

The second switching element 13 has a body diode (parasitic diode) D12 formed between the source and the drain so that the forward direction is directed from the source to the drain.

The second switching element 13 also has a gate connected to a drive terminal T42 of the control circuit 40 via the driver 17. The control circuit 40 supplies, to the gate, a second drive control pulse DR2 having two levels, that is, HIGH level and LOW level.

The second switching element 13 is basically controlled to remain at ON-state during a period in which the second drive control pulse DR2 is at HIGH level, and is controlled to remain at OFF-state during a period in which the second drive control pulse DR2 is at LOW level.

The second switching element 13 is iteratively controlled to be turned on or off according to the second drive control pulse DR2 from the control circuit 40.

The first drive control pulse DR1 and the second drive control pulse DR2 are generated to have complementary levels. That is, the first switching element 12 and the second switching element 13 are turned on or off alternately (complementarily) with each other.

Specifically, when the first drive control pulse DR1 is at HIGH level, the second drive control pulse DR2 is controlled to be at LOW level, and when the first drive control pulse DR1 is at LOW level, the second drive control pulse DR2 is controlled to be at HIGH level.

The first drive control pulse DR1 and the second drive control pulse DR2 are formed so that a dead band, in which both the drive control pulses DR1 and DR2 remain at LOW level, is provided during a level switching period.

The transformer 14 includes the primary side inductor (coil) L11 and the secondary side inductors (coils) L12 and L13. The primary side inductor L11 and the secondary side inductors L12 and L13 insulated to each other.

One end of the primary side resonance inductor L11 is connected to the connection point ND11 of the first switching element 12 and the second switching element 13, and the other end thereof is connected to one end of the resonance capacitor C11.

The resonance inductor L11 and the resonance capacitor C11 partially form a resonance circuit, through which two-way resonance currents flow according to complementary turn-on or turn-off operations of the first switching element 12 and the second switching element 13.

In the transformer 14, one end of the secondary side inductor L12 and one end of the secondary side inductor L13 are connected to a midpoint tap TP.

The current detection unit 15 is formed of a resistive element. One end of the current detection unit 15 is connected to the other end of the resonance capacitor C11, and the other end of the current detection unit 15 is connected to the ground potential GND.

The current detection unit 15 detects a resonance current passing through the first switching element 12 and the second switching element 13, and supplies a detection signal VIR to a terminal T43 of the control circuit 40.

The output circuit 20 supplies power (voltage) to a load based on a resonance current determined by the resonance inductor L11 and the resonance capacitor C11.

The output circuit 20 rectifies an output voltage from the primary side inductor L11 and the secondary side inductors L12 and L13 to output a DC voltage.

The output circuit 20 rectifies an output voltage provided by the secondary side inductors L12 and L13, and output a DC voltage.

The output circuit 20 in FIG. 2 includes a first diode D21, a second diode D22, a smoothing capacitor C21, resistive elements R21 to R23, a light emission diode D23 forming a light emitting device of a photocoupler, a zener diode ZD21, and a capacitor C22.

The output circuit 20 further includes an output node ND21, a reference node ND22, connection nodes ND23 and ND24, and an output terminal TO1.

The first diode D21 is connected between the other end (dot terminal) of the secondary side inductor L12 of the transformer 14 and the output node ND21 so that the forward direction is directed from the other end of the secondary side inductor L12 to the output node ND21.

In other words, an anode of the first diode D21 is connected to the other end (dot terminal) of the secondary side inductor L12, and a cathode of the first diode D21 is connected to the output node ND21.

The second diode D21 is connected between the other end (non-dot terminal) of the secondary side inductor L13 of the transformer 14 and the output node ND21 so that the forward direction is directed from the other end of the secondary side inductor L13 to the output node ND21.

In other words, an anode of the second diode D22 is connected to the other end (non-dot terminal) of the secondary side inductor L13, and a cathode of the first diode D21 is connected to the output node ND21.

The reference node ND22 is connected to the midpoint tap TP of the transformer 14.

One end (first electrode) of the smoothing capacitor C21 is connected to the output node ND21, and the other end (second electrode) thereof is connected to the reference node ND22.

Furthermore, the reference node ND22 is connected to the ground GND (reference potential).

The resistive elements R21 and R22 are connected in series between the output node ND21 and the reference node ND22, and connected to a connection node ND23 being a connection point therefor.

The resistive element R23, the light emission diode D23, and the zener diode ZD21 are connected in series between the output node ND21 and the reference node ND22. Furthermore, a connection node ND24 is formed of a connection point between a cathode of the light emission diode D23 and a cathode of the zener diode ZD21 for voltage stabilization.

Furthermore, the capacitor C22 is connected between the connection nodes ND23 and ND24.

The output circuit 20 divides an output voltage by means of the resistive elements R21 and R22, and transmits the voltage division signal to the feedback unit 30 as output voltage information in a form of an optical signal by means of the light emission diode D23.

The feedback unit 30 feeds back the DC voltage output information, that is output from the secondary side control circuit 20, to the primary side control circuit (switching controller) 40.

The feedback unit 30 includes a phototransistor TR31, which forms a photocoupler with the light emission diode D23 of the output circuit 20, and resistive elements R31 and R32.

An emitter of the phototransistor TR31 and one end of the resistive element R31 are both connected to the ground potential GND.

A collector of the phototransistor TR31 is connected to one end of the resistive element R32, and the other ends of the resistive elements R31 and R32 are both connected to a terminal T44 of the control circuit 40.

The control circuit 40 generates the first drive control pulse DR1 and the second drive control pulse DR2 as drive control signals having two levels for alternately turning on or off the first switching element 12 and the second switching element 13.

The control circuit 40 outputs the first drive control pulse DR1 as the first drive control signal from the drive terminal T41, and supplies the first drive control pulse DR1 to the gate of the first switching element 12 through the driver 16.

The control circuit 40 controls the first switching element 12 so that it remains at ON-state during a period in which the first drive control pulse DR1 is at HIGH level, and so that it remains at OFF-state during a period in which the first drive control pulse DR1 is at LOW level.

The control circuit 40 iteratively controls the first switching element 12 to be turned on or off using the first drive control pulse DR1.

The control circuit 40 outputs the second drive control pulse DR2 as the second drive control signal from the drive terminal T42, and supplies the second drive control pulse DR2 to the gate of the second switching element 13 through the driver 17.

The control circuit 40 controls the second switching element 13 so that it remains at ON-state during a period in which the second drive control pulse DR2 is at HIGH level, and so that it remains at OFF-state during a period in which the second drive control pulse DR2 is at LOW level.

The control circuit 40 iteratively controls the second switching element 13 to be turned on or off using the second drive control pulse DR2.

The control circuit 40 generates the first drive control pulse DR1 and the second drive control pulse DR2 so as to have complementary levels. That is, the first switching element 12 and the second switching element 13 are turned on or off alternately (complementarily) with each other.

Specifically, the control circuit 40 sets the second drive control pulse DR2 at LOW level when the first drive control pulse DR1 is at HIGH level, whereas sets the second drive control pulse DR2 at HIGH level when the first drive control pulse DR1 is at LOW level.

Furthermore, the control circuit 40 controls the first drive control pulse DR1 and the second drive control pulse DR2 so that a dead band in which the drive control pulses DR1 and DR2 both indicating a low level is provided during a level switching period.

The control circuit 40 controls the cycles of the first drive control pulse DR1 and the second drive control pulse DR2 according to the detected resonance current signal VIR from the current detection unit 15 so that an output power from the output circuit 20 is maintained at a constant level.

The control circuit 40 detects whether or not the resonance current detected by the current detection unit 15 remains beyond a first positive detection level V1 over a predetermined time period.

When it is detected that the resonance current remains beyond the first positive detection level V1 over the predetermined time period, and further detected that the resonance current falls below a second positive detection level V2, the control circuit 40 causes the levels of the drive control signals to be inverted. In this way, the control circuit 40 causes the levels of the drive control pulses DR1 and DR2 to turn on or off the first switching element 12 and the second switching element 13, respectively, to be inverted.

Furthermore, the control circuit 40 also detects whether or not the resonance current detected by the current detection unit 15 remains below a first negative detection level −V1 over a predetermined time period.

When it is detected that the resonance current remains below the first negative detection level −V1 over a predetermined time period, and further detected that the resonance current exceeds (i.e., is beyond) a second negative detection level −V2, the control circuit 40 causes the level of the drive control signal to be inverted. In this way, the control circuit 40 causes the levels of the drive control pulses DR1 and DR2 to turn on or off the first switching element 12 and the second switching element 13, respectively, to be inverted.

In this embodiment, the first positive detection level V1 and the second positive detection level V2 are set to an equal value, and the first negative detection level −V1 and the second negative detection level −V2 are set to an equal value, by way of example.

Furthermore, the predetermined time period varies according to the drive frequencies of the first switching element 12 and the second switching element 13.

(2. Exemplary Specific Structure of Control Circuit)

Figure 3:
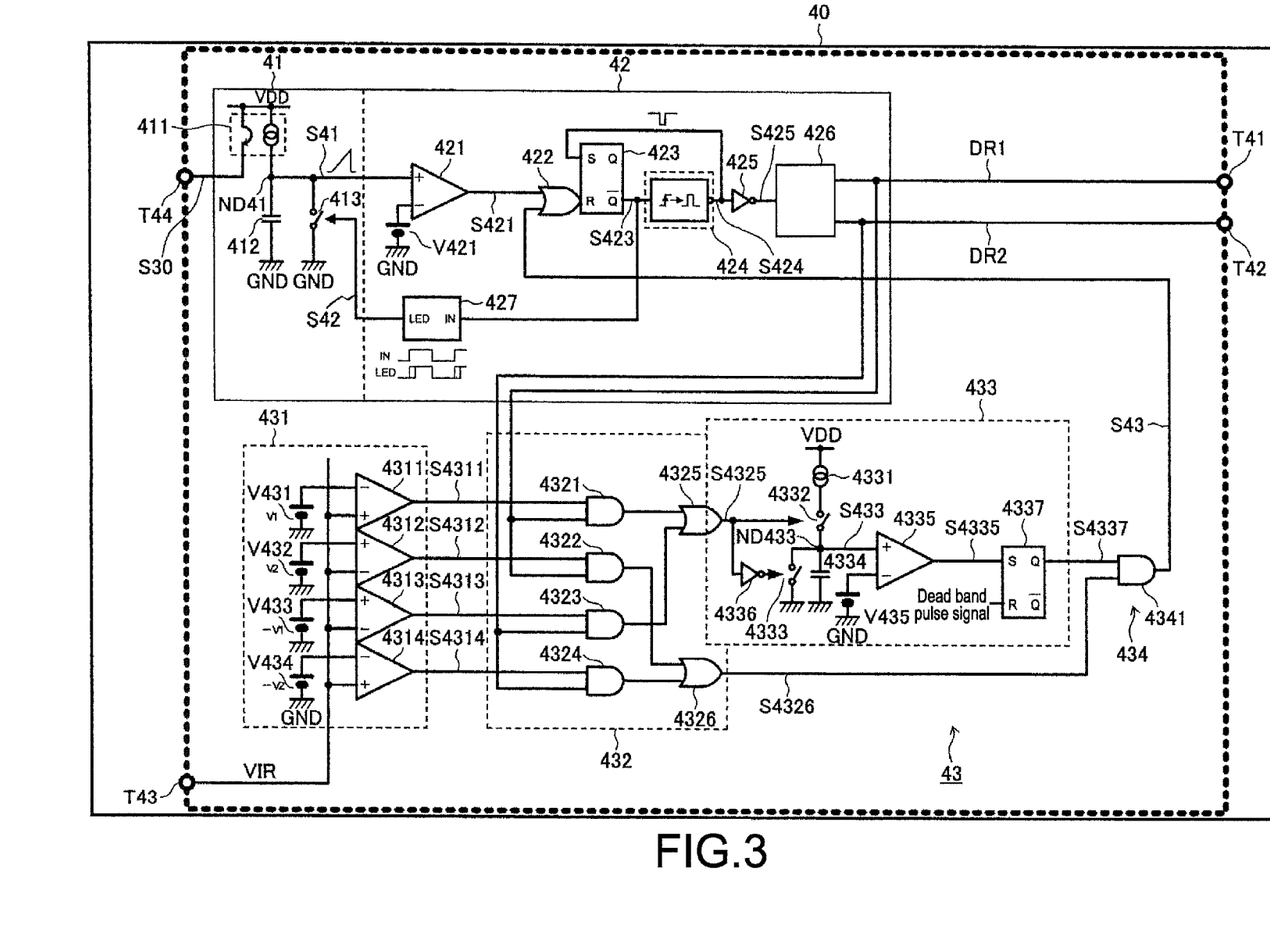
FIG. 3 is a diagram illustrating an exemplary structure of a control circuit according to the embodiment of the present technology.

FIG. 3 is a diagram illustrating an exemplary structure of the control circuit according to this embodiment of the present technology.

FIGS. 4A to 4F illustrate waveforms at main components in the circuit of FIG. 3.

In FIGS. 4A to 4F, rectangular waves are used for indicating HIGH level from a simulation viewpoint.

The control circuit (switching controller) 40 illustrated in FIG. 3 includes an oscillator unit 41, a pulse shaping unit 42, and a phase control unit 43.

The oscillator unit 41 includes a current mirror circuit 411, a capacitor 412 for triangular wave generation, and a switch 413.

The input terminal side of the current mirror circuit 411 is connected to a terminal T44 as a frequency control terminal, and the output terminal side of the current mirror circuit 411 is connected to one end of the capacitor 412 which in turn is connected to the ground potential GND at the other end.

Figures 4, 4A:
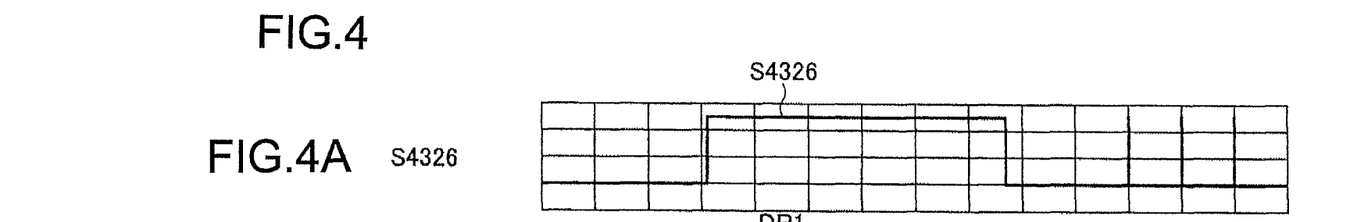
FIG. 4 is a diagram illustrating waveforms at main components in the control circuit in FIG. 3.
Figure 4B:
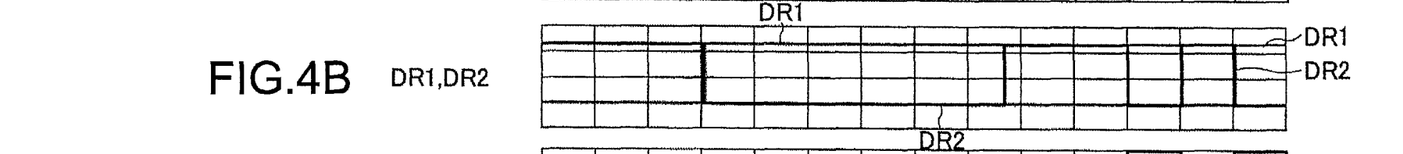
Figure 4C:
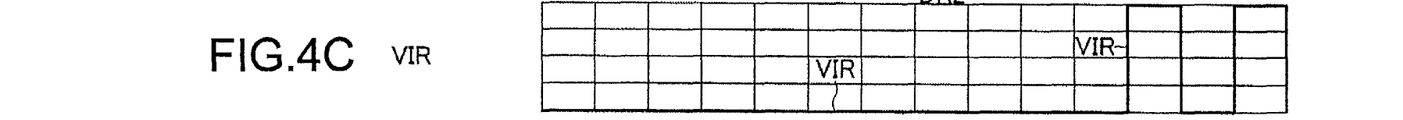
Figure 4D:
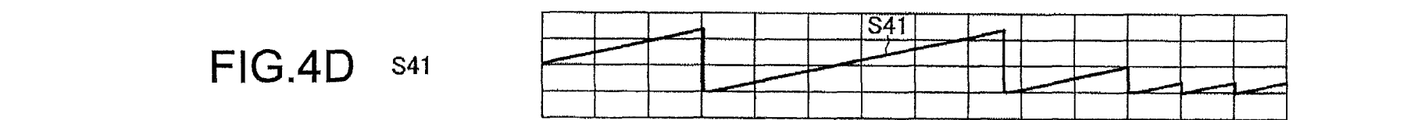

The oscillator unit 41 provides oscillation at a frequency corresponding to output voltage information S30 that is fed back from the feedback unit 30 through the terminal T44, generates a triangular wave S41 as illustrated in FIG. 4D from a node ND41, and supplies the triangular wave S41 to the pulse shaping unit 42.

The switch 413 is connected between the node ND41 and the ground potential GND, and is subjected to on-off control by a feedback signal S42 from the pulse shaping unit 42. The switch 413 is controlled to remain off during a triangular wave generation period. When the switch 413 is turned on, the triangular wave generated thereby is reset.

The pulse shaping unit 42 includes a reference voltage source V421, a comparator 421, a 2-input OR gate 422, an SR flip-flop 423, a dead band pulse forming circuit 424, an inverter 425, a pulse distribution unit 426, and a pulse feedback unit 427.

The comparator 421 has a non-inverting input terminal (+) that is connected to a triangular wave S41 supply line of the oscillator unit 41, and an inverting input terminal (−) that is connected to a reference power supply V421.

The comparator 421 outputs a pulse signal (clock signal) S421 that remains at HIGH level during a period in which the level of the triangular wave S41 is higher than the level of a reference voltage level.

The OR gate 422 is connected at one input terminal to a pulse signal S421 supply line of the comparator 421, is connected at the other input terminal to a detection signal S43 supply line of the phase control unit 43, and is connected at an output terminal to a reset terminal R of the flip-flop 423.

The flip-flop 423 has an inverting output terminal /Q ("/" represents "inversion") that is connected to an input terminal of the dead band pulse generation circuit 424 and an input terminal of the pulse feedback unit 427, and has a set terminal S that is connected to an output terminal of the dead band pulse generation circuit 424.

In response to the pulse signal S421 or the detection signal S43 at HIGH level from the OR gate 422, the flip-flop 423 is reset, and outputs a signal S423 transited to HIGH level from the inverting output terminal /Q.

Furthermore, when receiving at the set terminal S an output signal S424 from the dead band pulse generation circuit 424, the flip-flop 423 is set, and transits the signal S423 from the inverting output terminal /Q to LOW level.

In this way, the flip-flop 423 outputs the pulse signal S423, which is HIGH level during a period from the time when the flip-flop 423 is reset to the time when the flip-flop 423 is set, to the dead band pulse generation circuit 424 and the pulse feedback unit 427.

The dead band pulse generation circuit 424 generates a pulse signal S424 including a dead band pulse in synchronization with rise timings of the pulse signal S423 from the flip-flop 423.

The dead band pulse generation circuit 424 inverts the level of the pulse signal S424 thus generated, and outputs the level-inverted pulse signal S424 to the set terminal S of the flip-flop 423 and the inverter 425.

The inverter 425 outputs a pulse signal S425, which is the level-inverted signal of the level-inverted pulse signal S424, to the pulse distribution unit 426.

In response to the pulse signal S425 from the inverter 425, the pulse distribution unit 426 forms the first drive control pulse DR1 and the second drive control pulse DR2 including a dead band.

The pulse distribution unit 426 generates the first drive control pulse DR1 and the second drive control pulse DR2 in synchronization with rise timings of the pulse signal S425, inverts (switches) the levels of the first drive control pulse DR1 and the second drive control pulse DR2 each time the pulse signal S425 is received, and outputs the first and second drive controls DR1 and DR2 thus level-inverted.

The pulse distribution unit 426 outputs the first drive control pulse DR1 to the drive terminal T41 for the first switching element 12, and outputs the second drive control pulse DR2 to the drive terminal T42 for the second switching element 13.

The pulse distribution unit 426 inverts the levels of the first drive control pulse DR1 and the second drive control pulse DR2 each time the flip-flop 423 is reset by the pulse signal S421 or the detection signal S43.

As the flip-flop 423 is reset by the detection signal S43, the pulse distribution unit 426 forcedly inverts the levels of the first drive control pulse DR1 and the second drive control pulse DR2, regarding that an off-resonance condition is detected.

FIG. 4B illustrates how the levels of the first drive control pulse DR1 and the second drive control pulse DR2 are alternately inverted.

Receiving a pulse signal S423 from the flip-flop 423 at an input terminal IN, the pulse feedback unit 427 outputs a pulse signal S42 to the switch 413 after a predetermined time period later from the rise timing of the pulse signal S423 while maintaining the fall timing and the rise timing of the pulse signal S423.

The pulse feedback unit 427 remains the switch 413 at ON-state for a predetermined time period, thereby resetting the triangular wave 5421 generated by the oscillator unit 41.

The phase control unit 43 includes a level detection block 431, a selection unit 432, a level-duration detection unit 433, and an output unit 434.

The level detection block 431 includes a comparator 4311 as a first positive level detection unit, a comparator 4312 as a second positive level detection unit, a comparator 4313 as a first negative level detection unit, and a comparator 4314 as a second negative level detection unit.

The level detection block 431 further includes a first positive reference voltage source V431, a second positive reference voltage source V432, a first negative reference voltage source V433, and a second reference voltage source V434.

The comparator 4311 as the first positive level detection unit has a non-inverting input terminal (+) that is connected to the terminal T43 to which the detected resonance current signal VIR is input from the current detection unit 15, and an inverting input terminal (−) that is connected to the first positive reference voltage source V431.

The comparator 4311 compares the detected resonance current signal VIR received through the terminal T43 with the first positive reference voltage V1 provided by the first positive reference voltage source V431, and if the detected resonance current signal VIR is higher than the first positive reference voltage V1, the comparator 4311 outputs a first positive detection signal S4311 at HIGH level.

In this way, the comparator 4311 as the first positive level detection unit detects whether or not the resonance current detected by the current detection unit 15 exceeds the first positive detection level V1. If the resonance current exceeds the first positive detection level V1, the comparator 4311 outputs a first positive detection signal S4311 at HIGH level.

The comparator 4312 as the second positive level detection unit has an inverting input terminal (−) that is connected to the terminal T43 to which the detection resonance current signal VIR is input from the current detection unit 15, and a non-inverting input terminal (+) that is connected to the second positive reference voltage source V432.

The comparator 4312 compares the detected resonance current signal VIR received through the terminal T43 with the second positive reference voltage V2 provided by the second positive reference voltage source V432, and if the detected resonance current signal VIR is lower than (or falls below) the second positive reference voltage V2, the comparator 4312 outputs a second positive detection signal S4312 at HIGH level.

In this way, the comparator 4312 as the second positive level detection unit detects whether or not the resonance current detected by the current detection unit 15 falls below the second positive detection level V2. If the resonance current falls below the second positive detection level V2, the comparator 4312 outputs a second positive detection signal S4312 at HIGH level.

The first positive detection level V1 is set, for example, at 60 mV. The second negative detection level V2 is set, for example, at 60 mV that is the same as the first positive detection level V1. The second positive detection level V2 may be set at a value different from the first positive detection level, for example, at a freely selected value such as 50 mV, 70 mV, or the like.

The comparator 4313 as the first negative level detection unit has an inverting input terminal (−) that is connected to the terminal T43 to which the detection resonance current signal VIR is input from the current detection unit 15, and a non-inverting input terminal (+) that is connected to the first negative reference voltage source V433.

The comparator 4313 compares the detected resonance current signal VIR received through the terminal T43 and the first negative reference voltage −V1 provided by the first negative reference voltage source V433, and if the detected resonance current signal VIR is lower than (or falls below) the first negative reference voltage −V1, the comparator 4313 outputs a first negative detection signal S4313 at HIGH level.

In this way, the comparator 4313 as the first negative level detection unit detects whether or not the resonance current detected by the current detection unit 15 falls below the first negative detection level −V1. If the resonance current falls below the first negative detection level −V1, the comparator 4313 outputs a first negative detection signal S4312 at HIGH level.

The comparator 4314 as the second negative level detection unit has a non-inverting input terminal (+) that is connected to the terminal T43 to which the detection resonance current signal VIR is input from the current detection unit 15, and an inverting input terminal (−) that is connected to the second negative reference voltage source V434.

The comparator 4314 compares the detected resonance current signal VIR received through the terminal T43 with the first negative reference voltage −V2 provided by the second negative reference voltage source V434, and if the detected resonance current signal VIR is higher than the first positive reference voltage −V2, the comparator 4314 outputs a second negative detection signal S4314 at HIGH level.

In this way, the comparator 4314 as the second negative level detection unit detects whether or not the resonance current detected by the current detection unit 15 exceeds the second negative detection level −V2. If the resonance current exceeds the second negative detection level −V2, the comparator 4314 outputs a second negative detection signal S4314 at HIGH level.

The first negative detection level −V1 is set, for example, at −60 mV. The second negative detection level V2 is set, for example, at −60 mV that is the same as the first negative detection level −V1. The second negative detection level V2 may be set at a value different from the first negative detection level, for example, at a freely selected value such as −50 mV, −70 mV, or the like.

The selection unit 432 selectively outputs one of the first positive detection signal S4311 and the first negative detection signal S4313 from the level detection block 431 to the level-duration detection unit 433 according to the level of one of the first drive control pulse DR1 and the second drive control pulse DR2.

Similarly, the selection unit 432 selectively outputs one of the second positive detection signal S4312 and the second negative detection signal S4314 from the level detection block 431 to the output unit 434 according to the level of one of the first drive control pulse DR1 and the second drive control pulse DR2.

The selection unit 432 includes 2-input AND gates 4321 to 4324, and 2-input OR gates 4325 and 4326.

The AND gate 4321 is connected at one input terminal to a first positive detection signal S4311 supply line of the comparator 4321 as the first positive level detection unit, and connected at the other input terminal to a first drive control pulse DR1 supply line. The AND gate 4321 is connected at an output terminal to one of input terminals of the OR gate 4325.

The AND gate 4322 is connected at one input terminal to a second positive detection signal S4311 supply line of the comparator 4322 as the second positive level detection unit, and connected at the other input terminal to the first drive control pulse DR1 supply line. The AND gate 4322 is connected at an output terminal to one of input terminals of the OR gate 4326.

The AND gate 4323 is connected at one input terminal to a first negative detection signal S4313 supply line of the comparator 4323 as the first negative level detection unit, and connected at the other input terminal to a second drive control pulse DR2 supply line. The AND gate 4323 is connected at an output terminal to the other input terminal of the OR gate 4325.

The AND gate 4324 is connected at one input terminal to a second negative detection signal S4314 supply line of the comparator 4324 as the second negative level detection unit, and connected at the other input terminal to the second drive control pulse DR2 supply line. The AND gate 4324 is connected at an output terminal to the other input terminal of the OR gate 4326.

An output terminal of the OR gate 4325 is connected to an input terminal of the level-duration detection unit 423, and an output terminal of the OR gate 4326 is connected to one input terminal of the output unit 434.

The selection unit 432 with the structure as described above selects the first positive detection signal S4311 and the second positive detection signal S4312 from the first positive level detection unit (comparator 4311) and the second positive level detection unit (comparator 4312), respectively, when the first drive control pulse DR1 is at HIGH level for turning on the first switching element 12.

The selection unit 432 selects the first negative detection signal S4313 and the second negative detection signal S4314 from the first negative level detection unit (comparator 4313) and the second negative level detection unit (comparator 4314), respectively, when the second drive control pulse DR2 is at HIGH level for turning on the second switching element 13.

During a period in which the first drive control pulse DR1 is at HIGH level, according to the received first positive detection signal S4311 selected by the selection unit 432, the level-duration detection unit 433 detects whether or not a state, in which the resonance current is beyond the first positive detection level V1, remains over a predetermined time period T.

During a period in which the second drive control pulse DR2 is at HIGH level, according to the received first negative detection signal S4313 selected by the selection unit 432, the level-duration detection unit 433 detects whether or not a state, in which the resonance current is below the first negative detection level −V1, remains over the predetermined time period T.

The level-duration detection unit 433 includes a current source 4331, switches 4332 and 4333, a capacitor 4334, a comparator 4335, a reference voltage source V435 for providing a threshold of the predetermined time period T, an inverter 4336, a flip-flop 4337, and a node ND433.

The current source 4331 and the switch 4332 are connected in series between the power supply potential VDD and the node ND433. The capacitor 4334 and the switch 4333 are connected in parallel between the node ND433 and the ground potential GND.

The switch 4332 is turned on when an output signal from the OR gate 4235 of the selection unit 432 is at HIGH level, and is turned off when the output signal is at LOW level.

To the switch 4333, a signal, which is obtained by the inverter 4336 by level-converting the output signal from the OR gate 4325 of the selection unit 432, is supplied. Thus, the switch 4333 is turned on when the output signal from the OR gate 4325 of the selection unit 432 is at LOW level, and is turned off when the output signal is at HIGH level.

The comparator 4335 has a non-inverting input terminal (+) that is connected to the node ND 433, and an inverting input terminal (−) that is connected to the reference voltage source V435.

Furthermore, an output terminal of the comparator 4335 is connected to a set terminal S of the flip-flop 4337, and an output terminal of the flip-flop 4337 is in turn connected to the other input terminal of the output unit 434.

As a dead band pulse signal is supplied to a reset terminal R of the flip-flop 4337, the flip-flop 4337 is reset.

During a period in which the detected resonance current signal VIR is beyond the first positive detection level, or during a period in which the detected resonance current signal VIR is below the first negative detection level, and an output from the OR gate 4325 is at HIGH level, the level-duration detection unit 433 operates as described below.

Figure 4E:
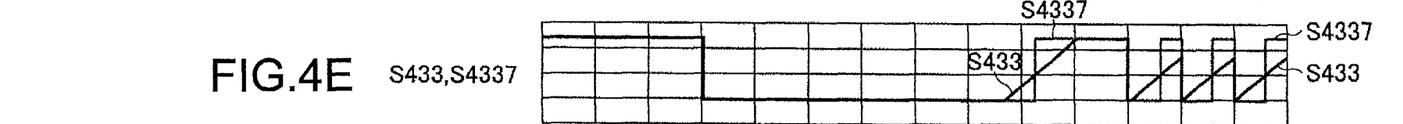

In such a situation, the switch 4332 is turned on, the switch 4333 is turned off, and a triangular wave 5433 gradually increasing in level as illustrated in FIG. 4E is formed at the node ND433. As the level of the triangular wave S433 becomes higher than the reference voltage, an output signal S4335 from the comparator 4335 is transited to HIGH level, the flip-flop 4337 is set, and an output signal S4337 from the flip-flop 4337 is transited to HIGH level.

This indicates that a state, in which the resonance current is beyond the first positive detection level V1, or a state, in which the resonance current is below the first negative detection level −V1, remains over the predetermined time period T.

After a while, when the resonance current falls below the first positive detection level V1, or when the resonance current exceeds the first negative detection level −V1, the output signal from the OR gate 4325 is transited to Low level.

As a result, in the level-duration detection unit 433, the switch 4332 is turned off, the switch 4333 is turned on, the potential of the node ND433 is reset to the ground potential, and the triangular wave 5433 is reset. The operation sequence as described above is repeatedly preformed.

The output unit 434 includes an AND gate 434.

The AND gate 4341 is connected at one input terminal to an output signal S4326 supply line of the OR gate 4326 of the selection unit 432, and is connected at the other input terminal to an output signal S4337 supply line of the flip-flop 4337 of the level-duration detection unit 433.

The output unit 434 recognizes that, as the output signal S4337 from the level-duration detection unit 433 is input at HIGH level, the state, in which a resonance current is beyond the first positive detection level V1, or the state, in which the resonance current is below the first negative detection level −V1, remains over the predetermined time period T.

As the output unit 434 receives the signal S4326 as illustrated in FIG. 4A at HIGH level, while recognizing the aforementioned state remains over the predetermined time period T, the output unit 434 detects that the resonance current falls below the second positive detection level V2 or exceeds the second negative detection level −V2.

The output unit 434 then outputs the detection signal S43 to the pulse shaping unit 42.

Figure 4F:
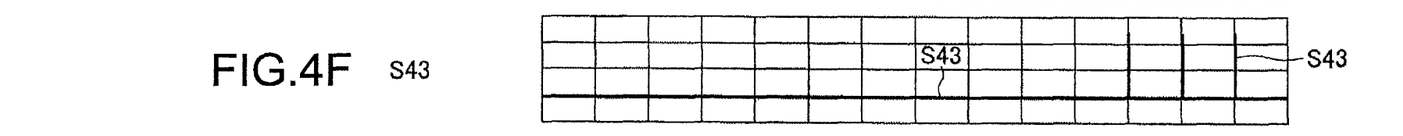

As illustrated in FIG. 4F, the detection signal S43 is output to the pulse shaping unit 42 as a signal like a very narrow spike. As illustrated in FIG. 4B, the first drive control pulse DR1 and the second drive control pulse DR2 are level-inverted in synchronization with this detention signal S43.

In the phase control unit 43 having the structure as described above, the comparator 4312 as the second positive level detection unit, the AND gate 4322, the OR gate 4326, and the output unit 434 function as a second positive level detection-and-output unit.

When the condition that the resonance current is beyond the first detection level over the predetermined time period T, is satisfied, the second positive level detection-and-output unit detects that the resonance current falls below the aforementioned second detection level, and outputs the detection result.

Furthermore, the comparator 4314 as the second negative level detection unit, the AND gate 4324, the OR gate 4326, and the output unit 434 function as a second negative level detection-and-output unit.

When the condition that the resonance current is below the first detection level over the predetermined time period T, is satisfied, the second negative level detection-and-output unit detects that the resonance current exceeds the aforementioned second detection level, and outputs the detection result.

In the phase control unit 43 according to this embodiment, the level-duration detection unit 433 and the output unit 434 are shared among the first positive level detection unit, the second positive level detection unit, the first negative level detection unit, and the second negative level detection unit.

(3. Operations of Control Circuit)

In the following, the description will be made on the operations of the switching power supply apparatus having the structure as described above, focusing on the operations of the control circuit 40 illustrated in FIG. 3.

In the control circuit 40, output voltage information S30 that is fed back from the feedback unit 30 through the terminal T44 is supplied to the oscillator unit 41, and the oscillator unit 41 provides oscillation at a frequency corresponding to the output voltage information S30.

As a result, the oscillator unit 41 generates a triangular wave S41, which in turn is supplied to the pulse shaping unit 42.

In the oscillator unit 41, the switch 413 is turned on or off according to a feedback signal S42 from the pulse shaping unit 42. The switch 413 is controlled to remain off during a triangular wave generation period. When the switch 413 is turned on, the triangular wave generated thereby is reset.

In the pulse shaping unit 42, the comparator 421 outputs a pulse signal (clock signal) 5421, which is transited to HIGH level during a period in which the level of the triangular wave S41 is higher than the reference voltage level, to the reset terminal R of the flip-flop 423 through the OR gate 422.

Furthermore, a detection signal S43 from the phase control unit 43 is also supplied to the OR gate 422.

When receiving the pulse signal S421 at HIGH level or the detection signal S43 from the OR gate 422, the flip-flop 423 is reset, and the flip-flop 423 outputs a signal S423 that was transited to HIGH level from the inverting output terminal /Q.

Furthermore, when receiving at the set terminal S an output signal S424 from the dead band pulse generation circuit 424, the flip-flop 423 is set, and in turn the signal S423 from the inverting output terminal /Q is transited to LOW level.

The dead band pulse generation circuit 424 generates a pulse signal S424 including a dead band pulse in synchronization with a rise timing of the pulse signal S423 from the flip-flop 423.

Then, the pulse signal S424 thus generated is level-inverted, and is output to the pulse distribution unit 426 through the set terminal S of the flip-flop 423 and the inverter 425.

In response to the pulse signal S425 from the inverter 425, the pulse distribution unit 426 forms a first drive control pulse DR1 and a second drive control pulse DR2 including a dead band.

The pulse distribution unit 426 generates the first drive control pulse DR1 and the second drive control pulse DR2 in synchronization with rise timings of the pulse signal 5425, inverts (switches) the levels of the first drive control pulse DR1 and the second drive control pulse DR2 each time the pulse signal S425 is input, and outputs the first and second drive control pulses DR 1 and DR2 thus level-inverted.

The pulse distribution unit 426 outputs the first drive control pulse DR1 to the drive terminal T41 of the first switching element 12, and outputs the second drive control pulse DR2 to the drive terminal T42 of the second switching element 13.

Note that the pulse distribution unit 426 inverts the levels of the first drive control pulse DR1 and the second drive control pulse DR2 each time the flip-flop 423 is reset by the pulse signal S421 or the detection signal S43.

As the flip-flop 423 is reset by the detection signal S43, the pulse distribution unit 426 forcedly inverts the levels of the first driving control pulse DR1 and the second driving control pulse DR2, regarding that an off-resonance condition is detected.

When receiving at the input terminal IN a pulse signal S423 from the flip-flop 423, the pulse feedback unit 427 outputs a pulse signal S42 to the switch 413 after a predetermined time period later from the rise timing of pulse signal S423 while maintaining the fall timing and the rise timing of the pulse signal S423.

The pulse feedback unit 427 remains the switch 413 at ON-state during a predetermined time period, thereby resetting the triangular wave 5421 generated by the oscillator unit 41.

In the phase control unit 43, the comparator 4311 compares a detected resonance current signal VIR from the terminal T43 with the first positive reference voltage V1 provided by the first positive reference voltage source V431. If the detected resonance current signal VIR is higher than the first positive reference voltage V1, a first positive detection signal S4311 at HIGH level is output to the selection unit 432.

In this way, the comparator 4311 detects whether or not the resonance current detected by the current detection unit 15 is beyond the first positive detection level V1, and if the resonance current is beyond the first positive detection level V1, the comparator 4311 outputs a first positive detection signal S4311 at HIGH level.

The comparator 4312 compares the detected resonance current signal VIR input from the terminal T43 with the second positive reference voltage V2 provided by the second positive reference voltage source V432. If the detected resonance current signal VIR is lower than the second positive reference voltage V2, a second positive detection signal S4312 at HIGH level is output to the selection unit 432.

In this way, the comparator 4312 detects whether or not the resonance current detected by the current detection unit 15 is below the second positive detection level V2, and if the resonance current is below the second positive detection level V2, the comparator 4312 outputs a second positive detection signal S4312 at HIGH level.

The comparator 4313 compares the detected resonance current signal VIR from the terminal T43 with the first negative reference voltage −V1 provided by the first negative reference voltage source V433. If the detected resonance current signal VIR is lower than the first negative reference voltage −V1, a first negative detection signal S4313 at HIGH level is output to the selection unit 432.

In this way, the comparator 4313 detects whether or not the resonance current detected by the current detection unit 15 is below the first negative detection level −V1, and if the resonance current is below the first negative detection level −V1, the comparator 4313 outputs a first negative detection signal S4313 at HIGH level.

The comparator 4314 compares the detected resonance current signal VIR from the terminal T43 with the second negative reference voltage −V2 provided by the second negative reference voltage source V434. If the detected resonance current signal VIR is higher than second negative reference voltage −V2, a second negative detection signal S4314 at HIGH level is output to the selection unit 432.

In this way, the comparator 4314 detects whether or not the resonance current detected by the current detection unit 15 is beyond the second negative detection level −V2, and if the resonance current is beyond the second negative detection level −V2, the comparator 4311 outputs a second negative detection signal S4314 at HIGH level.

The selection unit 432 selectively outputs one of the first positive detection signal S4311 and the first negative detection signal S4313 from the level detection block 431 to the level-duration detection unit 433 according to the levels of the first driving control pulse DR1 and the second driving control pulse DR2.

The selection unit 432 selectively outputs one of the second positive detection signal S4312 and the second negative detection signal S4314 from the level detection block 431 to the output unit 434 according to the levels of the first drive control pulse DR1 and the second drive control pulse DR2.

During a period in which the first drive control pulse DR1 is at HIGH level, according to the received first positive detection signal S4311 selected by the selection unit 432, the level-duration detection unit 433 detects whether or not a state, in which the resonance current is beyond the first positive detection level V1, remains over a predetermined time period T.

During a period in which the second drive control pulse DR2 is at HIGH level, according to the received first negative detection signal S4313 selected by the selection unit 432, the level-duration detection unit 433 detects whether or not a state, in which the resonance current is below the first negative detection level −V1, remains over a predetermined time period T.

During a period in which the detected resonance current signal VIR is beyond the first positive detection level, or during a period in which the detected resonance current signal VIR is below the first negative detection level, and an output from the OR gate 4325 is at HIGH level, the level-duration detection unit 433 operates as described below.

In such a situation, the switch 4332 is turned on, the switch 4333 is turned off, and a triangular wave 5433 gradually increasing in level is formed at the node ND433. As the level of the triangular wave 5433 becomes higher than the reference voltage, an output signal S4335 from the comparator 4335 is transited to HIGH level, the flip-flop 4337 is set, and an output signal S4337 from the flip-flop 4337 is transited to HIGH level.

This indicates that a state, in which the resonance current is beyond the first positive detection level V1, or a state, in which the resonance current is below the first negative detection level −V1, remains over the predetermined time period T.

After a while, when the resonance current falls below the first positive detection level V1, or when the resonance current exceeds the first negative detection level −V1, the output signal from the OR gate 4325 is transited to LOW level.

As a result, in the level-duration detection unit 433, the switch 4332 is turned off, the switch 4333 is turned on, the potential of the node ND433 is reset to the ground potential, and the triangular wave 5433 is reset. The operation sequence as described above is repeatedly preformed.

The output unit 434 recognizes that, as the output signal S4337 from the level-duration detection unit 433 is input at HIGH level, the state, in which a resonance current is beyond the first positive detection level V1, or the state, in which the resonance current is below the first negative detection level −V1, remains over the predetermined time period T.

As the output unit 434 receives the signal S4326 at HIGH level, while recognizing the aforementioned state remains over the predetermined time period T, the output unit 434 detects that the resonance current falls below the second positive detection level V2 or exceed the second negative detection level −V2.

The output unit 434 outputs the detection signal S43, which indicates that off-resonance is detected, to the pulse shaping unit 42.

The pulse shaping unit 42 inverts the levels of the first drive control pulse DR1 and the second drive control pulse DR2, in synchronization with this detection signal S43.

Figure 5:
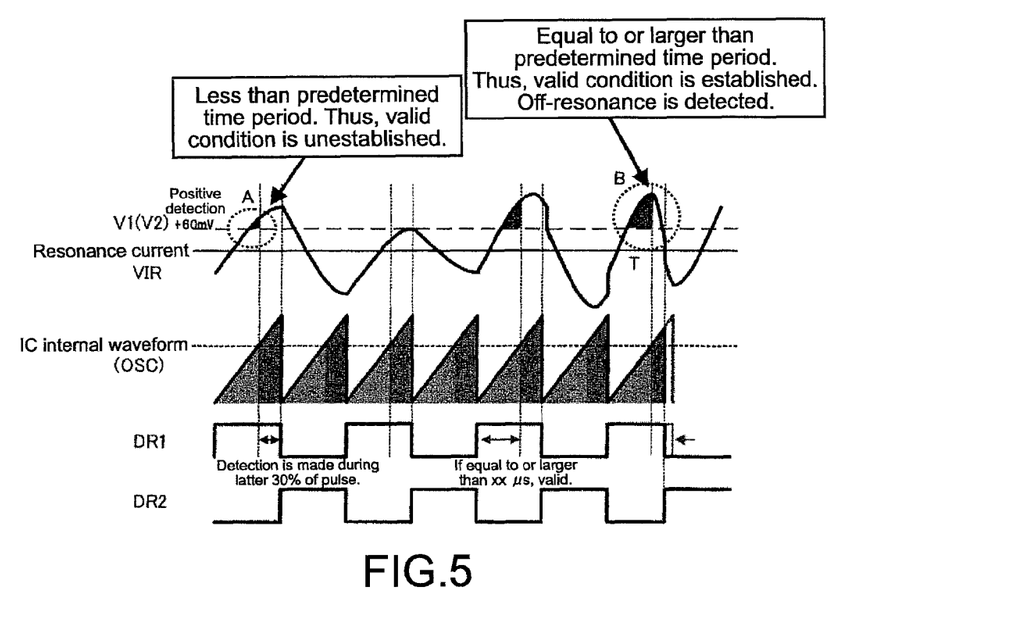
FIG. 5 is a diagram schematically illustrating an off-resonance detected state and an off-resonance non-detected state in the control circuit according to the embodiment of the present technology.

FIG. 5 is a diagram schematically illustrating an off-resonance detected state and an off-resonance non-detected state in the control circuit according to this embodiment of the present technology.

FIG. 5 illustrates, by way of example, an exemplary detection operation on the positive side.

As shown in a zone denoted by A in FIG. 5, a time period, during which the resonance current is beyond the first detection level V1, is less than a predetermined time period T. Thus, the output from the phase control unit 43 is invalid, so that the detection signal S43 is maintained at LOW level.

In contrast, as shown in a zone denoted by B in FIG. 5, a time period, during which the resonance current is beyond the first detection level V1, is equal to or larger than the predetermined time period T. Thus, the output from the phase control unit 43 is valid, so that the detection signal S43 is output at HIGH level for indicating detection of off-resonance.

Note that, as validity conditions for deciding presence of off-resonance, various conditions may be employed. For example, if the resonance current is beyond the first detection level V1 during a predetermined time period, that is, during the latter several tens percent (for example, the latter 30%) of each pulse, the output from the phase control unit 43 is valid. Alternatively, such a limitation may not be provided.

As described above, advantageous effects below may be achieved by the embodiment of the present technology.

According to the embodiment of the present technology, even if noise is applied to a terminal for current detection during heavy load detecting period, occurrence of malfunctions is substantially avoided and thus high noise immunity is ensured.

Furthermore, if a resonance current exceeds a first detection level as a threshold for off-resonance after an expected heavy load period, operation is not disabled.

As described above, according to the embodiment of the present technology, high noise immunity is provided so that occurrence of off-resonance may be surely prevented with no malfunctions, which in turn may provide stable operations of transistors that constitute a switching element.

The present technology may takes configurations as recited below.

(1) A switching power supply apparatus, comprising:
 a DC power supply including a high-side terminal and a low-side terminal;
 a first switching element and a second switching element, connected in series between the high-side terminal and the low-side terminal of the DC power supply;
 a resonance inductor and a resonance capacitor, connected in series to a connection point for the first and second switching elements;
 an output circuit configured to supply power to a load based on a resonance current provided by the resonance inductor and the resonance capacitor;
 a current detection unit configured to detect a resonance current passing through at least one of the first switching element and the second switching element; and
  a control circuit configured
   to generate a drive control signal at levels at which the first switching element and the second switching element are alternately turned on or off,
   to control a cycle of the drive control signal according to the detection signal from the current detection unit so that the output power from the output circuit is maintained constant,
   to perform at least one of
    detecting whether or not the resonance current detected by the current detection unit is beyond a first detection level over a predetermined time period, and detecting, in a case of detecting that the resonance current is beyond the first detection level over the predetermined time period, that the resonance current falls below a second detection level, and
    detecting whether or not the resonance current detected by the current detection unit is below a first detection level over a predetermined time period, and detecting, in a case of detecting that the resonance current is below the first detection level over the predetermined time period, that the resonance current exceeds a second detection level, and
   to invert, in a case of detecting that the resonance current falls below or exceeds the second detection level, the levels of the drive control signal at which the first switching element and the second switching element are turned on or off.

(2) The switching power supply apparatus according to (1), wherein
 the control circuit includes a phase control unit and a pulse shaping unit,
 the phase control unit including
  a first level detection unit configured to detect at least one of
   whether or not the resonant current detected by the current detection unit is beyond the first detection level, and
   whether or not the resonant current detected by the current detection unit is below the first detection level,
  a level-duration detection unit configured to detect whether or not one of a state in which the resonance current is beyond the first detection level and a state in which the resonance current is below the first detection level remains over the predetermined time period, and
  a second level detection-and-output unit configured
   to perform at least one of
    detecting, in a case where the state in which the resonance current is beyond the first detection level remains over the predetermined time period, whether or not the resonance current falls below the second detection level, and
    detecting, in a case where the state in which the resonance current is below the first detection level remains over the predetermined time period, whether or not the resonance current exceeds the second detection level, and
   to output a detection signal according to the detected result,
 the pulse shaping unit being configured
  to shape a drive control pulse as the drive control signal turning on or off the first switching element and the second switching element,
  to receive the detection signal from the second level detection-and-output unit of the phase control unit, the detection signal indicating that the resonance current falls below or exceeds the detection level, and
  to invert the levels of the drive control pulse in response to the detection signal.

(3) The switching power supply apparatus according to (2), further comprising:
 a first positive level detection unit configured to detect whether or not the resonance current detected by the current detection unit is beyond the first positive detection level;
 a second positive level detection-and-output unit configured to detect whether or not the resonance current falls below the second positive detection level, in a case where the resonance current is beyond the first positive detection level over the predetermined time period;
 a first negative level detection unit configured to detect whether or not the resonance current detected by the current detection unit is below the first negative detection level; and
 a second negative level detection-and-output unit configured to detect whether or not the resonance current exceeds the second negative detection level, in a case where the resonance current is below the first negative detection level over the predetermined time period.

(4) The switching power supply apparatus according to (3), wherein
 the second positive level detection-and-output unit includes
  a second positive level detection unit configured to detect whether or not the resonance current falls below the second positive detection level, and
  an output unit configured to output the detection signal according to the detection result from the level-duration detection unit and the result from the second positive level detection unit, to the pulse shaping unit,
 the second negative level detection-and-output unit includes
  a second negative level detection unit configured to detect whether or not the resonance current exceeds the second negative detection level, and
  an output unit configured to output the detection signal according to the detection result from the level-duration detection unit and the result from the second negative level detection unit, to the pulse shaping unit, and
 the output unit is shared by the first positive level detection unit, the second positive level detection unit, the first negative level detection unit, and the second negative level detection unit, the output unit supplying the signals according to the detection result from the level-duration detection unit and the detection results from the second positive and negative level detection units.

(5) The switching power supply apparatus according to (3) or (4), wherein
   the pulse shaping unit in the control circuit is configured
   to generate a first drive control pulse for driving the first switching element connected to the high-side terminal, and
   to generate a second drive control pulse for driving the second switching element connected to the low-side terminal, the second drive control pulse having a complementary level to a level of the first drive control pulse, and
   the phase control unit is configured
   to select and process a signal from the first positive level detection unit and a signal from the second positive level detection-and-output unit, in a case where the first drive control pulse is at a level at which the first switching element is turned on, and
   to select and process a signal from the first negative level detection unit and a signal from the second negative level detection-and-output unit, in a case where the second drive control pulse is at a level at which the second switching element is turned on.

(6) The switching power supply apparatus according to any one of (1) to (5), wherein
   the first detection level and the second detection level are equal to each other.

(7) The switching power supply apparatus according to any one of (1) to (6), wherein
   the predetermined time period varies according to a frequency of the first switching element and a frequency of the second switching element.

(8) The switching power supply apparatus according to any one of (1) to (7), wherein
the control circuit employs, as the predetermined time period for an off-resonance valid condition, a predetermined latter time period of each pulse, the off-resonance state being detected by performing at least one of
   detecting whether or not the resonance current detected by the current detection unit is beyond a first detection level over a predetermined time period, and detecting, in a case of detecting that the resonance current is beyond the first detection level over the predetermined time period, that the resonance current falls below a second detection level, and
   detecting whether or not the resonance current detected by the current detection unit is below a first detection level over a predetermined time period, and detecting, in a case of detecting that the resonance current is below the first detection level over the predetermined time period, that the resonance current exceeds a second detection level as off-resonance.

The present disclosure contains subject matter related to that disclosed in Japanese Priority Patent Application JP 2011-135654 filed in the Japan Patent Office on Jun. 17, 2011.

It should be understood by those skilled in the art that various modifications, combinations, sub-combinations and alterations may occur depending on design requirements and other factors insofar as they are within the scope of the appended claims or the equivalents thereof.

What is claimed is:
1. A switching power supply apparatus, comprising:
   a DC power supply including a high-side terminal and a low-side terminal;
   a first switching element and a second switching element, connected in series between the high-side terminal and the low-side terminal of the DC power supply;
   a resonance inductor and a resonance capacitor, connected in series to an connection point for the first and second switching elements;
   an output circuit configured to supply power to a load based on a resonance current provided by the resonance inductor and the resonance capacitor;
   a current detection unit configured to detect a resonance current passing through at least one of the first switching element and the second switching element; and
   a control circuit configured
      to generate a drive control signal at levels at which the first switching element and the second switching element are alternately turned on or off,
      to control a cycle of the drive control signal according to the detection signal from the current detection unit so that the output power from the output circuit is maintained constant,
      to perform at least one of
         detecting whether or not the resonance current detected by the current detection unit is beyond a first detection level over a predetermined time period, and detecting, in a case of detecting that the resonance current is beyond the first detection level over the predetermined time period, that the resonance current falls below a second detection level, and
         detecting whether or not the resonance current detected by the current detection unit is below a first detection level over a predetermined time period, and detecting, in a case of detecting that the resonance current is below the first detection level over the predetermined time period, that the resonance current exceeds a second detection level, and
      to invert, in a case of detecting that the resonance current falls below or exceeds the second detection level, the levels of the drive control signal at which the first switching element and the second switching element are turned on or off.

2. The switching power supply apparatus according to claim 1, wherein
   the control circuit includes a phase control unit and a pulse shaping unit,
   the phase control unit including
      a first level detection unit configured to detect at least one of
         whether or not the resonant current detected by the current detection unit is beyond the first detection level, and
         whether or not the resonant current detected by the current detection unit is below the first detection level,
      a level-duration detection unit configured to detect whether or not one of a state in which the resonance current is beyond the first detection level and a state in which the resonance current is below the first detection level remains over the predetermined time period, and
      a second level detection-and-output unit configured
         to perform at least one of
            detecting, in a case where the state in which the resonance current is beyond the first detection level remains over the predetermined time period, whether or not the resonance current falls below the second detection level, and detecting, in a case where the state in which the resonance current is below the first detection level remains over the predetermined time period, whether or not the resonance current exceeds the second detection level, and to output a detection signal according to the detected result, the pulse shaping unit being configured to shape a drive control pulse as the drive control signal turning on or off the first switching element and the second switching element, to receive the detection signal from the second level detection-and-output unit of the phase control unit, the detection signal indicating that the resonance current falls below or exceeds the detection level, and to invert the levels of the drive control pulse in response to the detection signal.

3. The switching power supply apparatus according to claim 2, further comprising:

a first positive level detection unit configured to detect whether or not the resonance current detected by the current detection unit is beyond the first positive detection level;

a second positive level detection-and-output unit configured to detect whether or not the resonance current falls below the second positive detection level, in a case where the resonance current is beyond the first positive detection level over the predetermined time period;

a first negative level detection unit configured to detect whether or not the resonance current detected by the current detection unit is below the first negative detection level; and a second negative level detection-and-output unit configured to detect whether or not the resonance current exceeds the second negative detection level, in a case where the resonance current is below the first negative detection level over the predetermined time period.

4. The switching power supply apparatus according to claim 3, wherein the second positive level detection-and-output unit includes a second positive level detection unit configured to detect whether or not the resonance current falls below the second positive detection level, and an output unit configured to output the detection signal according to the detection result from the level-duration detection unit and the result from the second positive level detection unit, to the pulse shaping unit, the second negative level detection-and-output unit includes a second negative level detection unit configured to detect whether or not the resonance current exceeds the second negative detection level, and an output unit configured to output the detection signal according to the detection result from the level-duration detection unit and the result from the second negative level detection unit, to the pulse shaping unit, and the output unit is shared by the first positive level detection unit, the second positive level detection unit, the first negative level detection unit, and the second negative level detection unit, the output unit supplying the signals according to the detection result from the level-duration detection unit and the detection results from the second positive and negative level detection units.

5. The switching power supply apparatus according to claim 3, wherein the pulse shaping unit in the control circuit is configured to generate a first drive control pulse for driving the first switching element connected to the high-side terminal, and to generate a second drive control pulse for driving the second switching element connected to the low-side terminal, the second drive control pulse having a complementary level to a level of the first drive control pulse, and the phase control unit is configured to select and process a signal from the first positive level detection unit and a signal from the second positive level detection-and-output unit, in a case where the first drive control pulse is at a level at which the first switching element is turned on, and to select and process a signal from the first negative level detection unit and a signal from the second negative level detection-and-output unit, in a case where the second drive control pulse is at a level at which the second switching element is turned on.

6. The switching power supply apparatus according to claim 1, wherein the first detection level and the second detection level are equal to each other.

7. The switching power supply apparatus according to claim 1, wherein the predetermined time period varies according to a frequency of the first switching element and a frequency of the second switching element.

8. The switching power supply apparatus according to claim 1, wherein the control circuit employs, as the predetermined time period for an off-resonance valid condition, a predetermined latter time period of each pulse, the off-resonance state being detected by performing at least one of detecting whether or not the resonance current detected by the current detection unit is beyond a first detection level over a predetermined time period, and detecting, in a case of detecting that the resonance current is beyond the first detection level over the predetermined time period, that the resonance current falls below a second detection level, and detecting whether or not the resonance current detected by the current detection unit is below a first detection level over a predetermined time period, and detecting, in a case of detecting that the resonance current is below the first detection level over the predetermined time period, that the resonance current exceeds a second detection level as off-resonance.

\* \* \* \* \*